United States Patent
Lucas et al.

(10) Patent No.: US 7,093,840 B2
(45) Date of Patent: Aug. 22, 2006

(54) MULTI-PURPOSE COMBINED LADDER/CART ASSEMBLY

(75) Inventors: Jeffrey T. Lucas, Southlake, TX (US); Eric McClure, Trabuco Canyon, CA (US)

(73) Assignee: Isotec, Inc., Garden Grove, CA (US)

( * ) Notice: Subject to any disclaimer, the term of this patent is extended or adjusted under 35 U.S.C. 154(b) by 0 days.

(21) Appl. No.: 10/791,264

(22) Filed: Mar. 1, 2004

(65) Prior Publication Data

US 2005/0189733 A1   Sep. 1, 2005

(51) Int. Cl.
*B60N 2/28* (2006.01)

(52) U.S. Cl. .................. 280/30; 280/47.28; 182/20; 182/82

(58) Field of Classification Search .......... 280/47.28, 280/47.21, 47.18, 43.1, 43.14, 652; 182/20, 182/21, 116, 120, 187; 301/44.1, 44.4
See application file for complete search history.

(56) References Cited

U.S. PATENT DOCUMENTS

| | | | | |
|---|---|---|---|---|
| 119,339 | A * | 9/1871 | Evans ..................... 280/30 |
| 584,150 | A * | 6/1897 | Bowman ................. 182/116 |
| 867,754 | A * | 10/1907 | Randall ................... 280/30 |
| 1,423,366 | A | 7/1922 | Snook |
| 2,519,113 | A | 8/1950 | Cohn |
| 3,282,375 | A * | 11/1966 | Ray ........................ 182/116 |
| 3,430,972 | A | 3/1969 | Fiedler |
| 3,556,248 | A | 1/1971 | Brown |
| 3,954,155 | A | 5/1976 | Guidara |
| 4,045,040 | A * | 8/1977 | Fails ...................... 182/20 |
| D249,032 | S | 8/1978 | Tarran |
| 4,106,590 | A | 8/1978 | Tarran |
| 4,253,546 | A | 3/1981 | Uchida |
| 4,258,826 | A | 3/1981 | Murray |
| 4,448,282 | A | 5/1984 | Glezendanner |
| 4,494,626 | A | 1/1985 | Ast |
| 4,934,485 | A | 6/1990 | Purkapile |
| 5,064,020 | A * | 11/1991 | Eagleson ................. 182/20 |
| 5,242,030 | A * | 9/1993 | Lobozzo ................. 182/116 |
| 5,314,042 | A * | 5/1994 | Adams ................... 182/116 |
| 5,433,291 | A * | 7/1995 | Shoestock, Sr. ......... 182/20 |
| 5,476,282 | A | 12/1995 | Dahl |
| 5,836,595 | A | 11/1998 | Brice |
| 5,839,538 | A * | 11/1998 | Magyar ................... 182/20 |
| 5,941,543 | A | 8/1999 | Kazmark, Jr. |
| 6,095,532 | A | 8/2000 | Martin |
| 6,173,811 | B1 * | 1/2001 | Tornabene et al. ....... 182/20 |
| 6,474,663 | B1 | 11/2002 | Becker |

(Continued)

OTHER PUBLICATIONS http:www.totaltrolley.com—Total Trolley™ 4 in 1 Magic Helper—A hand truck, dolly, flatbed cart, and a step ladder all in one tough, easy to store magic helper.

*Primary Examiner*—Hau Phan (57) ABSTRACT

A multi-purpose combined ladder/cart assembly capable of being converted into a plurality of ladder and cart configurations, including an extension ladder, a step ladder, a load-carrying cart, a pull cart, and a hand truck. The multi-purpose combined ladder/cart assembly includes a plurality of frame members that are pivotal with respect to each other and capable of being retained in variety of desired positions in order to easily configure the assembly in any of its various configurations. The travel characteristics and center of gravity of the cart configurations of the assembly are variably selectable, depending upon the load to be carried, by simply selecting various combinations of differently sized wheels to attach to the assembly.

12 Claims, 8 Drawing Sheets

U.S. PATENT DOCUMENTS 6,516,918 B1 * 2/2003 Hess .......................... 182/20
6,626,453 B1 * 9/2003 Theus et al. ................ 280/652
6,651,774 B1 11/2003 Yoo

* cited by examiner

MULTI-PURPOSE COMBINED LADDER/CART ASSEMBLY

BACKGROUND OF THE INVENTION

1. Technical Field

The subject invention relates generally to the field of hand carts, dollies, and ladders and, more particularly, to a novel multi-purpose, compact, lightweight and combination ladder/cart assembly.

2. Description of Related Art

Ladders are commonly used for a variety of applications and are generally configured as one of two types: a folding step ladder, which is self supporting, or a straight extension ladder, which is typically leaned against a wall or some other structure for support. Ladders which are constructed so that they may be used as both step ladders and as straight extension ladders have long been known in the art. It has also been known to form such multi-purpose ladders with wheels so that the ladders could be converted into a type of a wheeled, load-carrying device, such as a hand truck or dolly.

There are certain deficiencies associated with many of such prior combination ladder/cart devices that are presented in attempting to provide so many different functionalities. For instance, the existence of wheels on these devices, necessary for cart usage or hand truck usage, present an added difficulty in providing stability for the device in its usage as a ladder. When using the device as a ladder, the wheels need to be removed or moved out of the way to prevent the ladder from rolling. If the wheels are simply made very small so as not to interfere with the use of the device as a ladder, then the functionality of the device as a cart can be drastically diminished.

SUMMARY

The following is a summary of various aspects and advantages realizable according to various embodiments of the multi-purpose combined ladder/cart assembly according to the present invention. It is provided as an introduction to assist those skilled in the art to more rapidly assimilate the detailed discussion of the invention that ensues and does not and is not intended in any way to limit the scope of the claims that are appended hereto.

The various embodiments described below relate to a multi-purpose combined ladder/cart assembly capable of being converted into a plurality of ladder and cart configurations, including an extension ladder, a step ladder, a dolly, a pull cart, a push cart, a wagon, and a hand truck. The multi-purpose combined ladder/cart assembly includes a plurality of frame members that are pivotal with respect to each other and capable of being retained in variety of desired positions in order to easily configure the assembly in any of its various configurations. The frame members are pivotally movable with respect to each other to configure the assembly in an inverted V-shape in its step ladder configuration, while being further pivotally moveable to configure the assembly in an open position in its extension ladder configuration.

The frame members are further pivotal to configure the assembly into a compact, closed configuration where the assembly can be utilized in its various cart configurations. A plurality of wheels are attached to the first frame to allow the assembly to be utilized as a cart. In order to add to the functionality of the assembly as a cart, the assembly possesses a variably selectable center of gravity that can be easily changed depending upon the load to be carried. This variably selectable center of gravity is provided by a combination of two sets of wheels: a first set of smaller wheels that are attached to the first frame member and a second set of larger wheels that are attachable to the first set of smaller wheels in a variety of possible different configurations. By variably selecting which larger wheels to attach to which respective smaller wheels, the center of gravity of the assembly in the cart configuration can be selected based upon a load being carried. The different configurations of attaching the larger wheels to the smaller wheels also allow the travel characteristics of the cart configuration to be variably selected, such as the cart height, the cart angle and other various wheel parameters.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a multi-purpose combined ladder/cart assembly.

Figure 1:
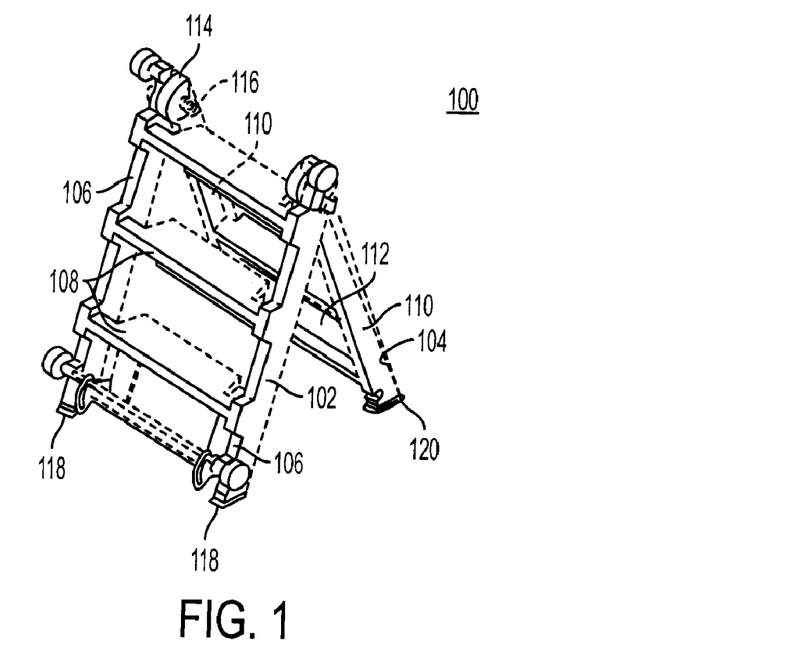
FIG. 1 is a perspective view of a preferred embodiment of the multi-purpose combined ladder/cart assembly configured as a step ladder.

Referring to FIG. 1, a multi-purpose combined ladder/cart assembly 100 formed in accordance with a first embodiment is illustrated in which the assembly 100 is configured as a step ladder. The assembly 100 includes a first frame 102 and a second frame 104 that are pivotally interconnected. The first frame 102 includes a pair of side rails 106 having a plurality of support members 108 extending between the side rails 106.

The second frame 104 also includes a pair of side rails 110 having a plurality of support members 112 extending between the side rails 110. The support members 108 and 112 serve as steps for the assembly in the step ladder configuration. Each of the support members 108, 112 for the first and second frames 102, 104 may further include a slip resistant material positioned on at least a portion of the support members 108, 112 to prevent a user from slipping when climbing the steps of the step ladder. The slip resistant material preferably comprises rubber or other similar material. The second frame 104 is pivotally attached to the first frame 102 about a pivot point 116 at one of its ends 114 of the side rails 110 of the second frame 104, wherein the pivot point 116 extends along a linear direction between the side rails 110. The second frame 104 may be attached to the first frame 102 in any manner of pivotal attachment known to those skilled in the art. For instance, each one of the pair of side rails 110 of the second frame 104 may be pivotally attached to a respective of the pair of side rails 106 of the first frame 102 with hinged attachments about co-linear pivot points 116, as shown in FIG. 1. Alternatively, the pivot point 116 may comprise a bar (not shown) extending between the side rails 106 of the first frame 102 that further extends through openings in the ends 114 of the side rails 110 of the second frame 104 that allows the second frame 104 to rotate about the bar.

In the step ladder configuration, the first frame 102 and the second frame 104 are rotated about the pivot point 116 until the assembly 100 forms an inverted V-shape, where the first and second frame 102, 104 are locked into place. The actual angle between the first frame 102 and the second frame 104 may be variably selected based upon the desired height and stability of the step ladder configuration selected by a user. Respective ends 118 and 120 of the first frame 102 and the second frame 104 are situated to rest against the ground or floor to support the assembly 100 in the step ladder configuration. The ends 118 and 120 may further be equipped with a slip-resistant material to resist movement of the step ladder assembly 100 during usage, such as the rubber material used on the support members 108, 112 or other similar material.

Figure 2:
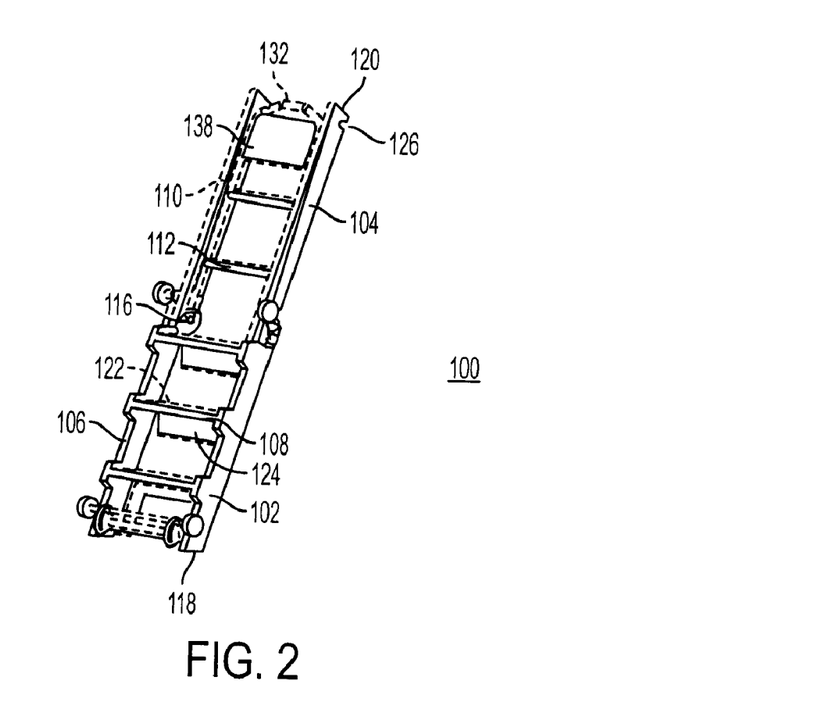
FIG. 2 is a perspective view of a preferred embodiment of the multi-purpose combined ladder/cart assembly configured as an extension ladder.

Referring to FIG. 2, the multi-purpose combined ladder/cart assembly 100 is shown configured as an extension ladder. In the extension ladder configuration, the second frame 104 is rotated about pivot point 116 with respect to the first frame 102 into an open position until the first frame 102 and the second frame 104 form a substantially straight ladder. While the extension ladder is shown and described as being substantially straight, it is also possible to configure the assembly 100 in other extension ladder configurations where the first frame 102 forms an angle with respect to the second frame 104 that is different than 180°. The end 118 of the first frame 102 will rest against the ground, while the end 120 of the second frame 104 will lean against a vertical surface, such as a wall, in use of the assembly 100 in the extension ladder configuration.

Similar to the step ladder configuration, the support members 108, 112 of the first and second frames 102, 104 function as the steps for the extension ladder configuration. At least a portion of the support members 108 of the first frame 102 are preferably formed in an L-shape having a foot supporting section 122 and a load carrying section 124 extending there from. The load carrying section 124 is useful when the assembly is configured in any of its cart configuration, and the utility of the load carrying section 124 will be further described in conjunction with those embodiments of the assembly. Any number or all of the support members 108 of the first frame 102 may be formed to possess this L-shape. It is also possible to form any number of the support members 112 of the second frame 104 to possess this L-shape, or it is possible to form any combination of the support members 108, 110 to possess this L-shape or for none of the support members 108, 110 to possess this L-shape.

The rubber material positioned on the ends 118, 120 of the first and second frames 102, 104 will again provide added stability in resisting movement of the extension ladder assembly 100 during usage. A notch 126 may further be formed in each of the side rails 110 of the second frame 104 for retaining the second frame 104 against the first frame 102 when pivoted into its closed, compact position, as will be described hereinafter. However, the notch 126 may further provide an added level of stability for the use of the assembly 100 as an extension ladder by accommodating a portion of the object the extension is being leaned against to help retain the assembly 100 against the object, such as by inserting the corner of a wall or the top of a fence into the notch 126.

Figure 3:
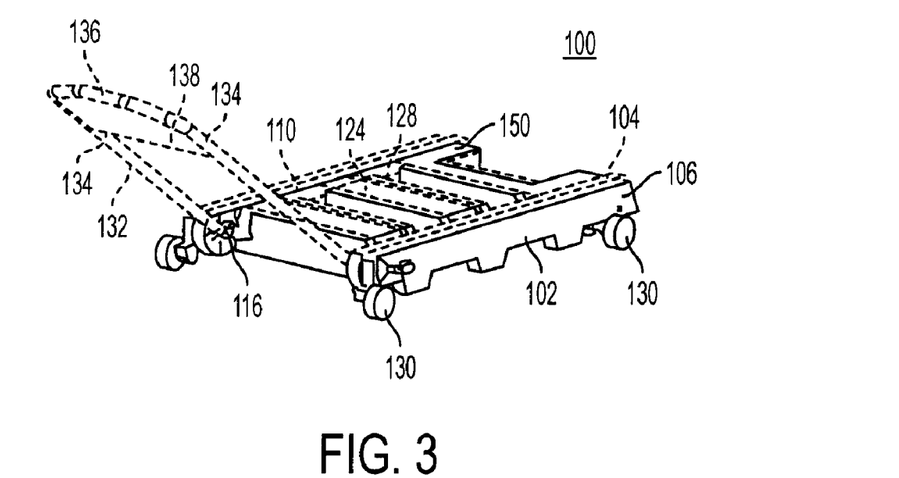
FIG. 3 is a perspective view of a preferred embodiment of the multi-purpose combined ladder/cart assembly configured as a pull cart.

Referring to FIG. 3, the multi-purpose combined ladder/cart assembly 100 is further configurable as a load carrying cart. In the cart configuration, the first frame 102 and the second frame 104 are rotated about the pivot point 116 with respect to each other into a closed position. The first and second frames 102, 104 are fittingly received with respect to each other such that the respective side rails 106, 110 of each of the frames 102, 104 are positioned substantially adjacent to each other in this closed position. This closed position of the assembly 100 aligns the first and second frames 102, 104. In this aligned, closed position of the first and second frames 102, 104, the load carrying sections 124 of the support members 108 of the first frame 102 further align with the edge 128 of the support members 112 of the second frame 104 to provide a relatively flat, load carrying surface for objects in the load carrying cart configuration.

In order to provide this alignment of the first and second frames 102, 104 in one preferred embodiment, the distance between the side rails 110 of the second frame 104 is smaller than the distance between the side rails 106 of the first frame 102 so that the second frame 104 is situated between and adjacent to the side rails 106 of the first frame 102 in the closed position. In order to assist in retaining the second frame 104 against the first frame 102 in this closed position, the notches 126 in the side rails 110 of the second frame 104 preferably engage a portion of the first frame 102. For instance, a bar extending between the side rails 106 of the first frame 102 may be received within the notches 126 of the second frame 104.

A set of wheels 130 are attached to one side of the first frame 102 for the assembly 100 to be rolled upon in its closed, load carrying cart configuration. The wheels 130 may comprise any type of wheels known in the art to be used for carts, such as caster-type wheels or the like. The wheels 130 should be sufficiently small in size so as not to intrude with the other uses of the assembly 100 in its various other configurations. In this compact, closed position, the assembly 100 may be used as a dolly, wherein the assembly is easily converted into a dolly by simply rotating the first and second frames 102, 104 with respect to each other into this closed position. The assembly 100 can also be easily stored in this compact form.

In another preferred embodiment, the assembly 100 includes a handle frame 132 that is pivotally attached to at least one of the first frame 102 and the second frame 104. The handle frame 132 preferably includes a pair of side rails 134 having a handle gripping portion 136 extending between the side rails 134 at one their ends. While the handle frame 132 may be connected in any known manner of pivotal attachment, the handle frame 132 is preferably pivotally attached about pivot point 116 by having co-linear pivot points extend through co-linear openings in the side rails 134 of an open end of the handle frame 132 in order to allow the handle frame 132 to rotate about the same pivot point 116 as the first and second frames 102, 104. In the closed position when the assembly 100 is to utilized as a dolly, the handle frame 132 is pivoted to lay adjacent to the first and second frames 102, 104 (not shown). In this closed position, the side rails 134 of the handle frame 132 are preferably positioned between the side rails 110 of the second frame 104.

The handle frame 132 may be pivoted outwardly from the closed position into an open position to configure the assembly 100 into a pull cart, as shown in FIG. 3. The handle frame 132 may either be freely rotatable or may be locked into a set position in this open position. The handle gripping portion 136 may be shaped to accommodate a user's grip or may further include a rubber material or other slip-resistant material positioned thereon. The side rails 134 of the handle frame 132 may further be formed to be telescoping, so that the handle frame 132 may be extended into a longer, open position or contracted into a shorter, closed position.

In another preferred embodiment, a tool carrying compartment 138 is arranged to extend between the side rails 134 of the handle frame 132 for holding various types of tools. The tool carrying compartment 138 may further be pivotally attached to the side rails 134 of the handle frame 132, thus allowing the tool carrying compartment 138 to rotate with respect to the handle frame 132. This can be particularly useful when the assembly 100 is being utilized in its extension ladder configuration, as shown in FIG. 2, where the tool carrying compartment 138 can be rotated and locked into a substantially horizontal position so that a user having climbed the extension ladder can access tools contained therein without having to climb back down the extension ladder. It further enables the tool carrying compartment 138 to be utilized as a shelf to support objects for a user having climbed the extension ladder.

In order to add to the functionality and versatility of the assembly 100 as a cart in carrying various types of loads, the assembly 100 possesses a variably selectable center of gravity that can be easily changed depending upon the load to be carried. In order to adjust the center of gravity of the assembly, a second set of larger wheels 140 are provided that are attachable to the first set of smaller wheels 130 in a variety of possible different configurations. By variably selecting which larger wheels 140 to attach to which respective smaller wheels 130, the center of gravity of the assembly 100 in the cart configuration can be selected to best accommodate the load being carried. For instance, as illustrated in FIG. 3, only smaller wheels 130 are utilized such that the travel characteristics of the cart are entirely provided by the smaller wheels 130. The height of the cart, the terrain the cart negotiate, and the angle of the cart with respect to its supporting surface are determined by the characteristics of the smaller wheels 130.

Figure 4:
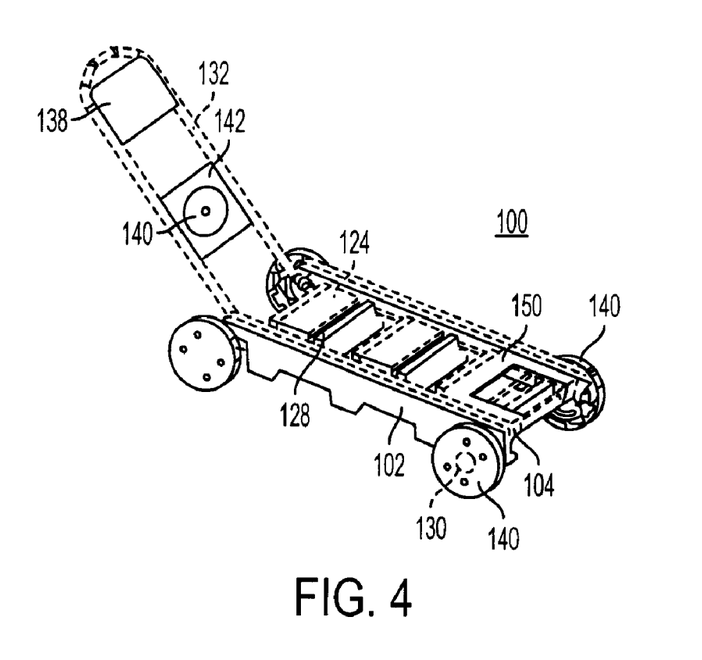
FIG. 4 is a perspective view of another preferred embodiment of the multi-purpose combined ladder/cart assembly configured as a pull cart.

In another cart configuration of the assembly 100 illustrated in FIG. 4, larger wheels 140 are attached to each of the smaller wheels 130. The cart assembly of FIG. 4 will thus have a higher center of gravity than the cart assembly of FIG. 3, due to the higher cart height provided by the attached larger wheels 140. Depending upon the particular load be support by the assembly 100 in the cart configuration, an appropriate center of gravity can be selected by either attaching or not attaching the larger wheels 140 to the smaller wheels 130. The larger wheels 140 also provide greater clearance underneath the cart assembly than the clearance provided by the smaller wheels 130. The larger wheels 140 further enable the cart assembly 100 to travel over more rugged terrain than the smaller wheels 130. Thus, it can be seen that the travel characteristics of the cart configurations of the assembly 100 can be altered by selecting whether or not to attach the larger wheels 140 to the smaller wheels 130.

Figure 5:
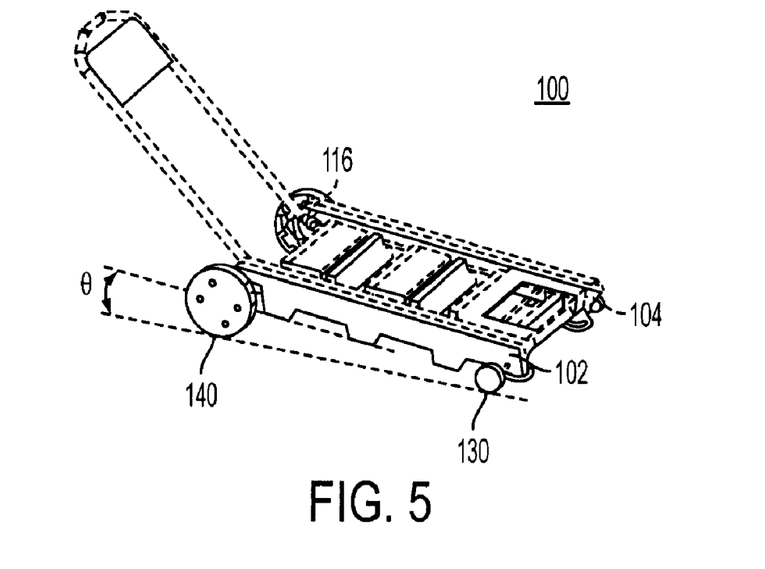
FIG. 5 is a perspective view of yet another preferred embodiment of the multi-purpose combined ladder/cart assembly configured as a pull cart.
Figure 6:
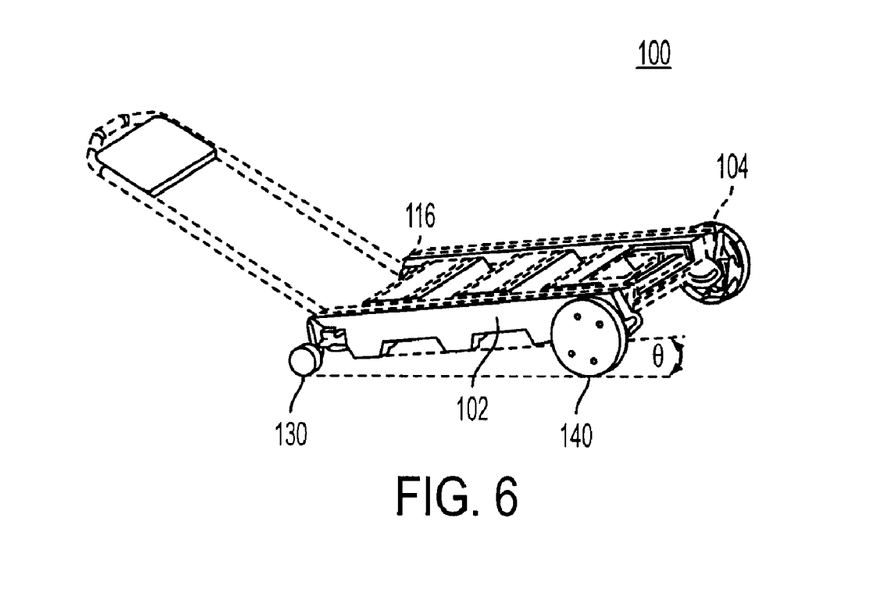
FIG. 6 is a perspective view of still another preferred embodiment of the multi-purpose combined ladder/cart assembly configured as a pull cart.

Referring now to FIGS. 5 and 6, various other combinations of attaching the larger wheels 140 to the smaller wheels 130 are illustrated showing other types of cart configurations of the assembly 100 having different centers of gravity and different travel characteristics. In FIG. 5, the larger wheels 140 are only attached to those smaller wheels 130 closest to the pivot point 116 of the handle frame 132, which moves the center of gravity of this configuration closer to the larger wheels 140 and higher off the ground (i.e., the transport surface) than if the larger wheels 140 had not been attached to the smaller wheels 130. In FIG. 6, the larger wheels 140 are only attached to those smaller wheels 130 furthest from the pivot point 116, which again moves the center of gravity of this configuration closer to the larger wheels 140 and higher off the ground than if the larger wheels 140 had not been attached to the smaller wheels 130. By only attaching the larger wheels 140 to a limited number of the smaller wheels 140 (as shown in FIGS. 5 and 6), the angle or slope θ of the load carrying surface of the cart configuration of the assembly 100 is also changed with respect to the transport surface. Thus, depending upon the characteristics (e.g., size, weight, shape, form, etc.) of the particular load being carried, the travel characteristics of the cart configuration can be variably selected to best accommodate the particular load by selecting the appropriate configuration of attaching larger wheels 140 to smaller wheels 130. Thus, the center of gravity, the cart height, the cart clearance, the cart angle or slope, and the negotiation of a particular terrain of the assembly 100 in its cart configuration can all be advantageously optimized through respective selected configurations of attaching larger wheels 140 to smaller wheels 130.

The particular dimensions of the smaller wheels 130 and the larger wheels 140 are not critical to the functionality of the present invention, where it is only important that the larger wheels 140 are larger with respect to the smaller wheels 130 so as to alter the travel characteristics of the cart configurations of the assembly 100 when attached to the smaller wheels 130. Although not required to be, the larger wheels 140 may further be formed from a heavy-duty rubber material that allow the cart to negotiate larger objects and more rugged terrain than the smaller wheels 130.

Figure 11:
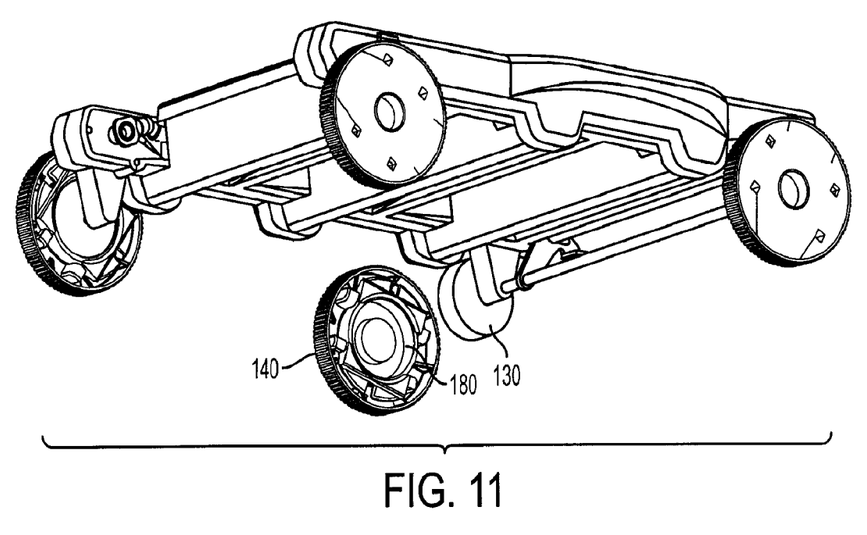
FIG. 11 is a partially assembled perspective view of a preferred embodiment of attaching a larger wheel to a smaller wheel of the multi-purpose combined ladder/cart assembly.

The larger wheels 140 may be attached to the smaller wheels 130 in any manner of attachment. Suitable methods of attachment include, but are not limited to, having the larger wheels 140 pressed onto, snapped onto, clipped onto, bolted onto, screwed onto, or otherwise affixed to the smaller wheels 130. In one specific embodiment, the larger wheels 140 have a recess for matingly receiving the smaller wheels 130, where an outside diameter of a smaller wheel 130 is designed to fit within an inside diameter of a conforming cavity 180 located in the center of an attachable larger wheel 140, as illustrated in FIG. 11. When the cavity 180 of the larger wheel 140 is centered over and on top of the smaller wheel 130, the larger wheel 140 can be attached by simply pushing it toward the smaller wheel 130. The smaller wheel 130 will nest itself inside the center cavity 180 of the larger wheel 140.

Figure 12:
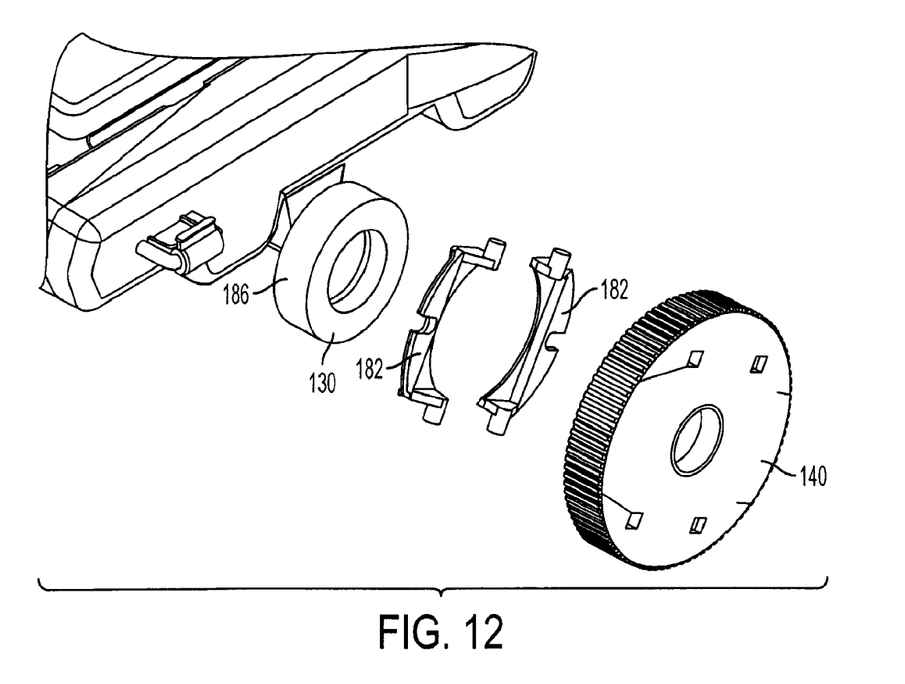
FIG. 12 is an exploded, close-up perspective view of another preferred embodiment of attaching a larger wheel to a smaller wheel of the multi-purpose combined ladder/cart assembly.
Figure 13:
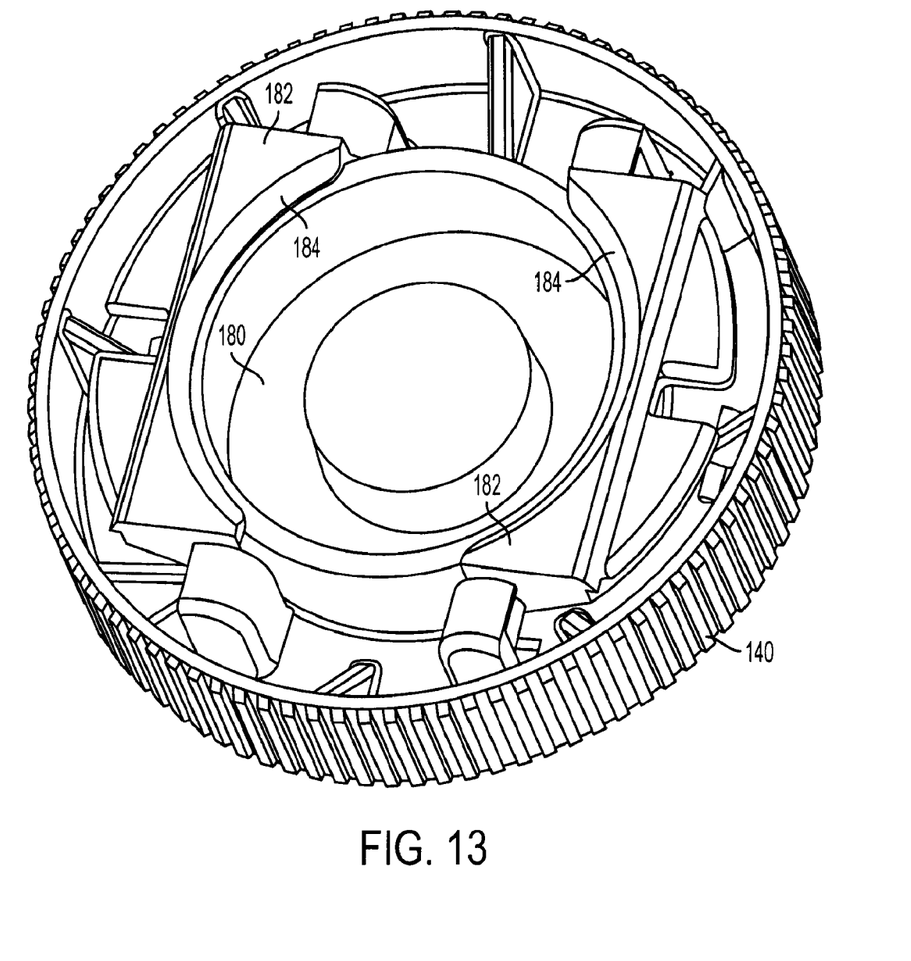
FIG. 13 is a perspective view of a preferred embodiment of a larger wheel of the multi-purpose combined ladder/cart assembly.
Figure 14:
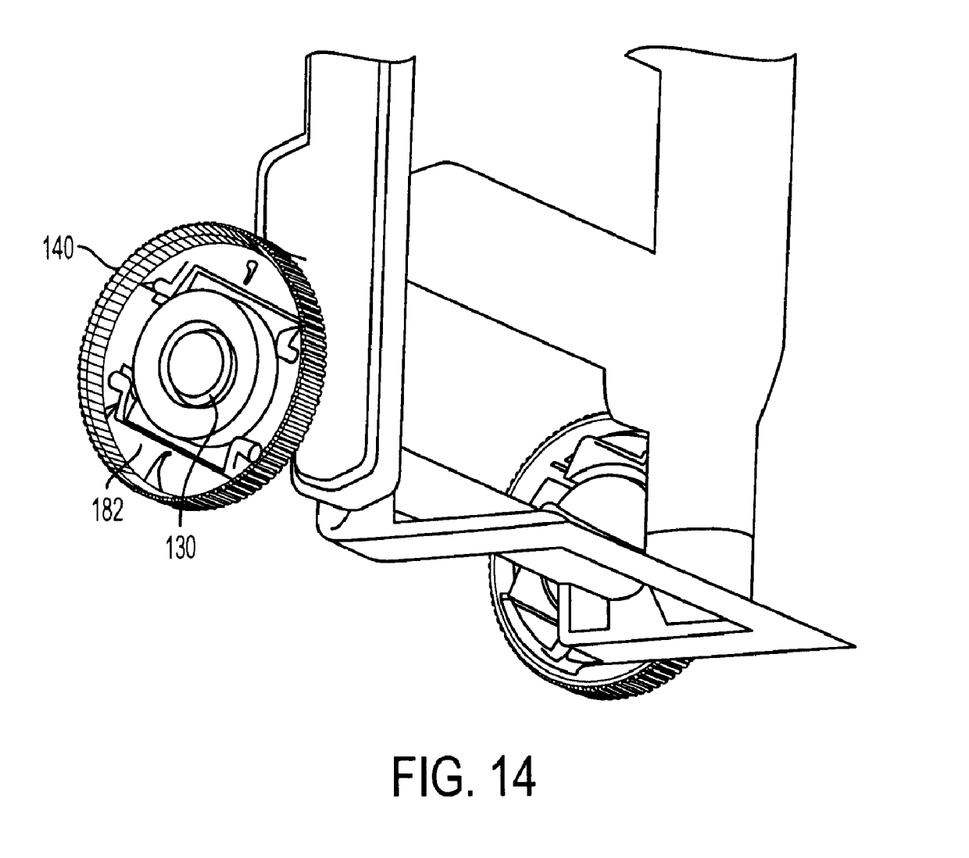
FIG. 14 is a partially transparent perspective view of a preferred embodiment of attaching a larger wheel to a smaller wheel in the hand-truck configuration of the multi-purpose combined ladder/cart assembly.

In order to further retain the larger wheel 140 against the smaller wheel 130, at least one retaining clip 182 can be provided to retain the smaller wheel 130 within the cavity 180 of the larger wheel 140, as shown in FIGS. 12–14. The force of pushing the larger wheel 140 onto the smaller wheel 130 causes the "C" shaped retaining clips 182, which are spring loaded inside the larger wheel 140, to widen and receive the smaller wheel 130 into the cavity 180 of the larger wheel 140. The retaining clips 182 may include sloped portions 184 to assist in guiding the smaller wheels 130 into the cavity 180 as well as to assist in widening the retaining clips 182. When the smaller wheel 130 is fully inserted into the cavity 180, the "C" shaped retaining clips 182 will close behind an inner surface 186 of the smaller wheel 130 to retain the smaller wheel 130 within the cavity 180. For added wheel stability, the retaining clips 182 may further clamp themselves against an outer perimeter 188 of the smaller wheel 130 or an inner wheel wall of the smaller wheel 130. Once positioned over the smaller wheel 130, the larger wheel cannot be removed unless the "C" shaped retaining clips 182 are manually widened utilizing two squeezable tabs 190.

The larger wheels 140 may also be configured such that they are matingly attachable to one another, enabling a plurality of larger wheels 140 to be interconnected together to provide wheel assemblies comprising a combination of larger wheels 140 having even larger widths than the width of a single larger wheel 140 by itself. These combinations of larger wheels 140 can then be attached to the smaller wheels 130 in a similar manner as described above. In order to provide for easy interchangeability between the various cart configuration, the larger wheels 140 are preferably stored in a storage compartment 142 provided between the side rails 134 of the handle frame 132.

Figure 7:
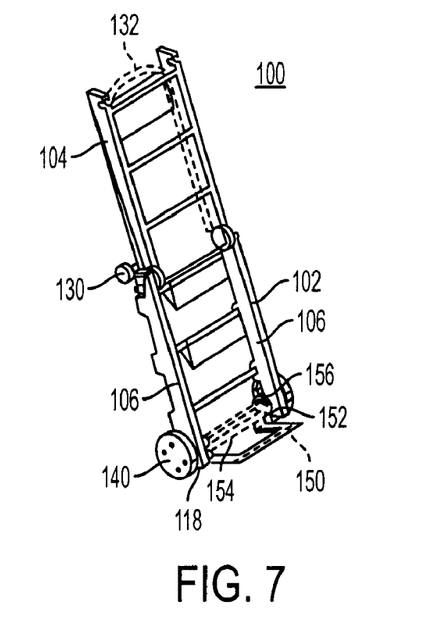
FIG. 7 is a perspective view of a preferred embodiment of the multi-purpose combined ladder/cart assembly configured as a hand truck.

Referring now to FIG. 7, the multi-purpose combined ladder/cart assembly 100 is illustrated as being further configurable as a load-carrying hand truck. In this embodiment, the assembly 100 includes a fourth frame 150 that is pivotally attached to the end 118 of the first frame 102 about a pivot point 152. The fourth frame 150 may be attached to the first frame 102 in any manner of pivotal attachment known to those skilled in the art. For instance, a bar 154 may extend between the side rails 106 of the first frame 102 and may further extend through an opening in the fourth frame 150 that allows the fourth frame 150 to rotate about the bar 154. In the hand truck configuration, the fourth frame 150 is rotated about the pivot point 152 into an open position where the fourth frame 150 forms a desired angle with respect to the first frame 102 for carrying a load. The fourth frame 150 may also include a pair of tracks 156 or guides that engage respective protrusions from the side rails 106 of the first frame 102 for limiting the rotation of the fourth frame 150 to the length of the tracks 156 and for locking the fourth frame into the open position. The fourth frame 150 then serves as a load-carrying support member for the hand truck configuration. It should be noted that the fourth frame 150 also serves as another component of the load carrying surface of the assembly 100 in its dolly and pull cart configurations when the fourth frame 150 is pivoted into its closed position, as shown in FIGS. 3–6.

To further configure the assembly 100 in the hand truck configuration, the second frame 104 and the handle frame 132 are pivoted with respect to the first frame 102 into an open position to essentially form a 180° angle with respect to the first frame 102, as shown in FIG. 7. By pivoting the respective frames of the assembly into these described desired positions and locking them in place, the assembly 100 is configured into essentially an L-shape in the hand truck configuration. A pair of larger wheels 140 are attached over the smaller wheels 130 at the end 118 of the first frame 102 adjacent to the fourth frame 150. These larger wheels 140 are preferably heavy-duty rubber wheels that allow the hand truck to travel up and down stairs and to negotiate more rugged terrain than the smaller wheels 130.

Figure 8:
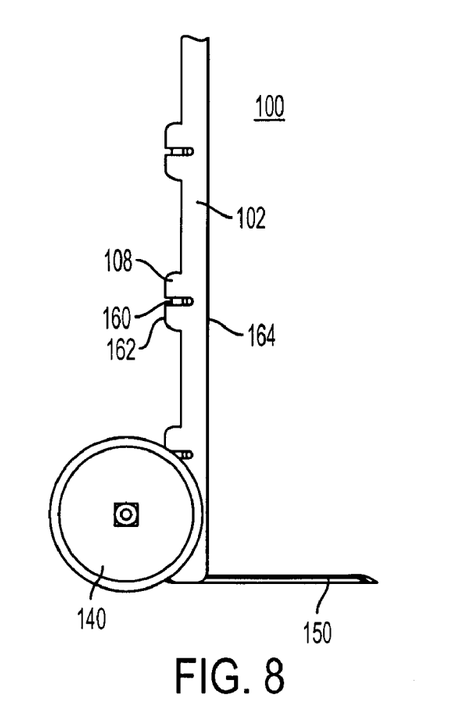
FIG. 8 is a partial, side view of another preferred embodiment of the multi-purpose combined ladder/cart assembly.

Referring now to FIG. 8, another preferred embodiment of the assembly 100 is illustrated in which at least one of the support members 108 of the first frame 102 include a groove 160 extending along one of its surfaces 162 for receiving a cord (not shown), such as an elastic cord or rope or the like, for retaining objects against the assembly 100. The groove 160 is positioned on the same side of the support member 110 as the wheels 140, so that the cord can be situated within the groove 160 and then extended around the other side 166 of the first frame 102 in order to retain objects being carried by the assembly 100 against the side 164 of the first frame 102. The grooves 160 in the support members 108 of the first frame 102 can also be useful in accommodating cords for retaining objects against the assembly 100 in any of its possible configurations, such as when the assembly 100 is configured in any of its load carrying cart configurations.

Figure 9:
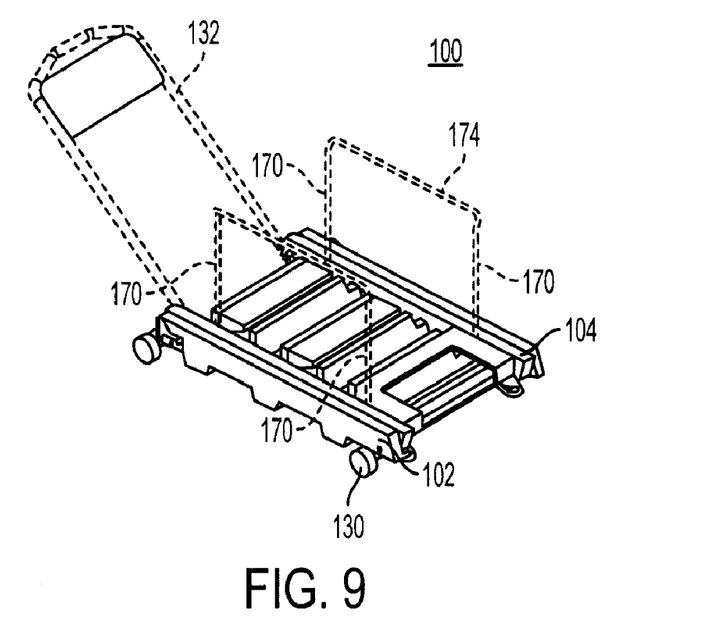
FIG. 9 is a perspective view of a preferred embodiment of the multi-purpose combined ladder/cart assembly partially assembled as a wagon.
Figure 10:
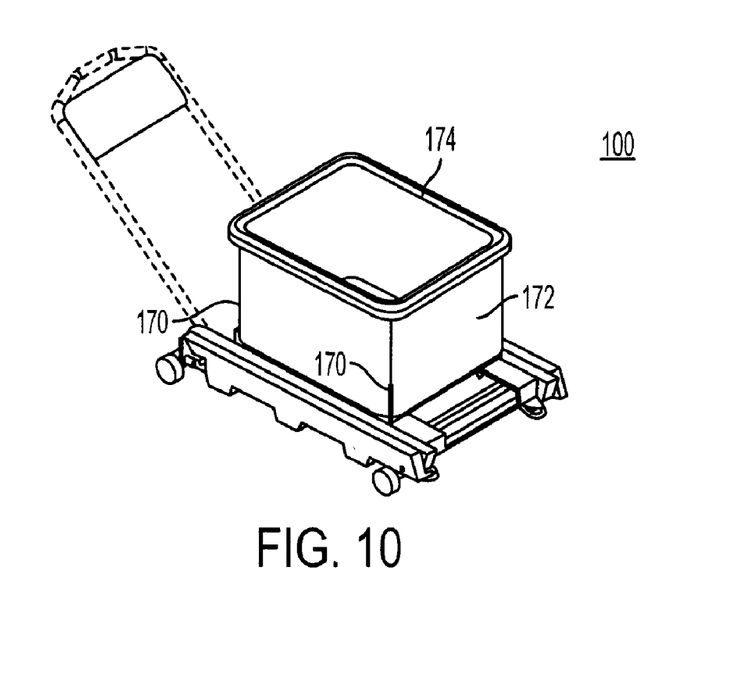
FIG. 10 is a perspective view of a preferred embodiment of the multi-purpose combined ladder/cart assembly configured as a wagon.

Referring now to FIGS. 9 and 10, the multi-purpose combined ladder/cart assembly 100 is illustrated as being further configurable as a wagon. When the assembly 100 is configured in its pull cart configuration with the first and second frames 102, 104 arranged in their closed position, a plurality of receptacle support members 170 are provided that may be attached to at least one of the first and second frames 102, 104 for supporting a receptacle 172. The receptacle support members 170 may comprise a plurality of poles that are insertably received in respective openings in either of the first and second frames 102, 104. A number of cross-support members 174 may be connected between the ends 176 of the receptacle support members 170 or integrally formed with the receptacle support members 170 to form U-shaped members. The receptacle 172 is then attached to and supported by the receptacle support members 170 in any manner known to those skilled in the art depending upon the composition of the receptacle 172, wherein the receptacle 172 may comprise a rigid container (e.g., a preformed box) containing a lip that engages receptacle support members 170 and/or cross-support members 174 or may comprise a pliable container (e.g., a bag) that is affixed to the receptacle support members 170 and/or cross-support members 174. The receptacle 172 may further be supported in part on its bottom surface by the first and second frames 102, 104. Objects may then be inserted into the receptacle 172 to allow the assembly 100 to be utilized as a load carrying wagon.

As can be seen from the foregoing, a multi-purpose combined ladder/cart assembly 100 formed in accordance with the present invention provides a versatile device that is capable of easily being transformed between a variety of possible uses, such as an extension ladder, a step ladder, a dolly, a pull cart, a wagon, and a hand truck, by simply pivoting the various components of the assembly 100 into their desired position. Moreover, the multi-purpose combined ladder/cart assembly 100 formed in accordance with the present invention can be configured as a cart configuration having its travel characteristics variably selectable by selecting particular combinations of larger wheels and smaller wheels, wherein the larger wheels are conveniently stored on the assembly itself.

The different structures of the multi-purpose combined ladder/cart assembly of the present invention are described separately in each of the above embodiments. However, it is the full intention of the inventors of the present invention that the separate aspects of each embodiment described herein may be combined with the other embodiments described herein. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A multi-purpose combination ladder/cart assembly, comprising:
   a first frame having side rails and support members disposed between said side rails;
   a second frame pivotally connected to said first frame, said second frame having side rails and support members disposed between said side rails of said second frame;
   said first and second frames being pivotally movable with respect to each other to configure said assembly into at least one type of ladder configuration;
   said first and second frames being further pivotally movable with respect to each other into a closed position to configure said assembly into a cart configuration; and
   a set of wheels connecting to the first frame capable of being arranged in a variety of possible configurations in order to provide a variably selectable center of gravity for said assembly in the cart configuration,
   wherein the center of gravity of said assembly in the cart configuration is capable of being changed by changing the configuration of the set of wheels connected to said first frame,
   wherein each of the possible configurations of said set of wheels provides said assembly with different traveling height and angle characteristics in the cart configuration, and
   wherein said set of wheels includes a first set of smaller wheels attached to said first frame and a second set of larger wheels attachable to said first set of smaller wheels, wherein a particular number of said larger wheels are selected to be attached to a respective number of smaller wheels in order to select the desired center of gravity for said cart configuration.

2. The multi-purpose combination ladder/cart assembly of claim 1, further comprising
   a handle frame pivotally connected to at least one of said first and second frames,
   wherein said handle frame is pivotally movable into a closed position to configure said assembly into a dolly configuration,
   further wherein said handle frame is pivotally movable into an open position to configure the assembly into a pull cart configuration.

3. The multi-purpose combination ladder/cart assembly of claim 1, further comprising
   a handle frame pivotally connected to at least one of said first and second frames,
   wherein said handle frame is pivotally movable into a closed position to configure said assembly into a dolly configuration, further wherein said handle frame is pivotally movable into an open position to configure the assembly into a pull cart configuration;
   said handle frame further comprising a storage area for storing said second set of larger wheels.

4. The multi-purpose combination ladder/cart assembly of claim 1, wherein said larger wheels are further matingly attachable to one another in order to form wheel assemblies having widths wider than a width of a single larger wheel alone.

5. The multi-purpose combination ladder/cart assembly of claim 1, wherein said smaller wheels do not interfere with the use of the assembly in any ladder configuration.

6. A multi-purpose combination ladder/cart assembly, comprising:
   a first frame having side rails and support members disposed between said side rails;
   a second frame pivotally connected to said first frame, said second frame having side rails and support members disposed between said side rails of said second frame;
   said first and second frames being pivotally movable with respect to each other to configure said assembly into at least one type of ladder configuration;
   said first and second frames being further pivotally movable with respect to each other into a closed position to configure said assembly into a cart configuration; and
   a set of wheels connecting to the first frame capable of being arranged in a variety of possible configurations in order to provide a variably selectable center of gravity for said assembly in the cart configuration., further comprising a handle frame pivotally connected to at least one of said first and second frames,
   wherein said handle frame is pivotally movable into a closed position to configure said assembly into a dolly configuration,
   further wherein said handle frame is pivotally movable into an open position to configure the assembly into a pull cart configuration, and
   wherein each of said first frame, said second frame, and said handle frame are pivotal about the same pivotal axis.

7. A multi-purpose combination ladder/cart assembly, comprising:
   a first frame having side rails and support members disposed between said side rails;

a second frame pivotally connected to said first frame, said second frame having side rails and support members disposed between said side rails of said second frame;

said first and second frames being pivotally movable with respect to each other to configure said assembly into at least one type of ladder configuration;

said first and second frames being further pivotally movable with respect to each other into a closed position to configure said assembly into a cart configuration; and a set of wheels connecting to the first frame capable of being arranged in a variety of possible configurations in order to provide a variably selectable center of gravity for said assembly in the cart configuration, and a third frame pivotally connected to said first frame about a pivotal axis;

wherein said set of wheels includes a first set of smaller wheels attached to said first frame and a second set of larger wheels attached to two of said smaller wheels adjacent to said pivotal axis of said third frame;

said second frame being pivotally movable with respect to said first frame into an opened position to configure said assembly into a hand truck configuration; and said third frame being pivotally movable to form an angle with respect to said first frame for supporting a load in said hand truck configuration.

8. The multi-purpose combination ladder/cart assembly of claim 7, wherein said ladder configurations include a step ladder configuration and an extension ladder configuration.

9. The multi-purpose combination ladder/cart assembly of claim 7, further comprising a groove formed in at least one surface of at least one of said steps for containing a cord, wherein said cord can be utilized to retain an object being carried against the assembly.

10. The multi-purpose combination ladder/cart assembly of claim 7, further comprising:

a plurality of receptacle support members attachable to at least one of said first and second frames on an opposite side of said assembly from said set of wheels, and a receptacle capable of being attached to and supported by said receptacle support members, wherein said receptacle support members and said receptacle allow said assembly to be utilized as a wagon when said assembly is configured in the cart configuration.

11. The multi-purpose combination ladder/cart assembly of claim 7, wherein said support members on at least one of said first frame and said second frame are substantially L-shaped, each L-shaped step having a foot supporting portion and a load bearing portion extending there from, wherein said foot supporting portion bears the weight of a user when said assembly is configured in a ladder configuration and said load bearing portion assists in bearing a load carried by the assembly when configured in the cart configuration.

12. The multi-purpose combination ladder/cart assembly of claim 11, wherein said load bearing portions of said support members of one of said first and second frames further mate with said support members from the other of said first and second frames when said first and second frames are configured into the closed cart position in order to provide a substantially flat carrying surface for objects.

* * * * *